United States Patent [19]
Tsutsui et al.

[11] Patent Number: 6,128,565
[45] Date of Patent: Oct. 3, 2000

[54] HYDRAULIC CONTROL SYSTEM FOR AUTOMATIC TRANSMISSION

[75] Inventors: Hiroshi Tsutsui; Takao Taniguchi; Kazumasa Tsukamoto; Masaaki Nishida; Yoshihisa Yamamoto; Masao Saito, all of Anjo, Japan

[73] Assignee: Aisin AW Co., Ltd., Japan

[21] Appl. No.: 09/145,885

[22] Filed: Sep. 2, 1998

[30] Foreign Application Priority Data

Sep. 4, 1997 [JP] Japan ................................. 9-240081

[51] Int. Cl.⁷ .............................. B60K 31/00; F16H 5/00
[52] U.S. Cl. ................................ 701/51; 701/54; 701/61; 701/64; 701/69; 477/34; 477/45; 477/107; 477/110; 477/115; 477/117; 477/156
[58] Field of Search ................................. 701/51, 54, 64, 701/69, 61; 477/107, 110, 115, 6, 7, 156, 34, 45, 116, 117

[56] References Cited

U.S. PATENT DOCUMENTS

| | | | |
|---|---|---|---|
| 5,475,595 | 12/1995 | Asahara et al. | 701/51 |
| 5,782,711 | 7/1998 | Tsutsui et al. | 477/156 |
| 5,842,950 | 12/1998 | Tsutsui et al. | 477/143 |

Primary Examiner—William A. Cuchlinski, Jr.
Assistant Examiner—Yonel Beaulieu
Attorney, Agent, or Firm—Lorusso & Loud

[57] ABSTRACT

In a disengagement side control, in a power on state, a disengagement side pressure $P_W$ is output, $P_W$ being set higher than a base pressure dependent on input torque, and a disengagement side frictional engagement element is engaged and maintained. In a power off state, a disengagement side pressure lower than the base pressure is output, and the disengagement side frictional engagement element slips. In the disengagement side control, when the vehicle driving state is changed from the power off state to the power on state, the disengagement side pressure $P_W$ is changed from that for a slip state to that for a maintain state.

37 Claims, 13 Drawing Sheets

POWER OFF UPSHIFT TIME CHART

HYDRAULIC CONTROL SYSTEM FOR AUTOMATIC TRANSMISSION

BACKGROUND OF THE INVENTION

1. Field of the Invention

The invention relates to a hydraulic control system for an automatic transmission. More specifically, it relates to a hydraulic control system which performs a clutch to clutch shift in which one frictional engagement element is engaged and an another frictional engagement element is disengaged at the same time to effect a shift to a predetermined gear ratio.

2. Description of the Related Art

In general, the different "vehicle driving states" include (1) a power on state in which an accelerator pedal is depressed during vehicle driving and a torque is transmitted from the engine to the vehicle wheels, that is to say, the torque is a positive value, (2) a power off state in which the accelerator pedal is released during vehicle driving and torque is not transmitted from the engine to the vehicle wheels but, rather, the torque is transmitted from the vehicle wheels to the engine, that is to say, the torque is a negative value, and (3) a state in which the vehicle changes from the power on state to the power off state. Automatic transmissions are designed to provide shift control in accordance with the particular vehicle driving states.

A conventional hydraulic control system for an automatic transmission is described in Japanese Kokai publication Hei 6-323415. In an up-shift by a clutch to clutch shift, the hydraulic control system detects the power on state or the power off state before the shift starts. Then, shift control is provided in accordance with one of plural predetermined control logics which correspond to the various vehicle driving states, based on the one detected vehicle driving state. In this prior art hydraulic control system, the output torque is detected by a sensor and then it is determined if the input torque of the transmission is a positive value or a negative value. When the input torque is a positive value, that is to say, when the vehicle driving state is the power on state, the shift is effected by controlling the engagement side pressure, and the disengagement side pressure is controlled so that a disengagement side frictional engagement element is disengaged at the end of a torque phase. When the input torque is a negative value, that is to say, when the vehicle driving state is the power off state, the shift is effected by controlling the disengagement side pressure, and the engagement side pressure is controlled so that the engagement side pressure is increased at the end of the shift. By these control schemes, shifts are performed smoothly without shock in the power on state and in the power off state, and a sensation of speed reduction during the power off state is avoided.

The conventional hydraulic control system requires a memory capacity for the hydraulic controls performed with different control logics for the power on state and for the power off state. The vehicle driving state is changed to the power on state during the shift in the power off state when, for example, a driver presses the accelerator pedal to maintain or increase the vehicle speed during an up-shift dictated by increasing vehicle speed with the vehicle powered by inertia or by driving on a down-hill where the throttle opening is low (e.g. 0). In such circumstances the disengagement side frictional engagement element is disengaged completely to avoid sensation of the speed reduction because the shift control is performed with the control logic determined at the shift start and the driving state at that time is the power off state. Therefore, when the driving state is changed to the power on state, engine racing occurs because no disengagement side pressure is applied to the disengagement side frictional engagement element.

SUMMARY OF THE INVENTION

Therefore, an object of the invention is to provide a hydraulic control system for an automatic transmission which uses a common control logic in both a power on state and a power off state, and which prevents both a feeling of a speed reduction in the power off state and the engine racing which otherwise occurs when the vehicle driving state is changed from the power off state to the power on state.

In order to achieve the aforementioned object, the present invention provides a unique hydraulic control system for performing an up-shift to a predetermined gear ratio by engaging a first frictional engagement element and disengaging a second frictional engagement element. The transmission controlled in accordance with the present invention includes an input shaft which receives power from an engine output shaft, an output shaft which is connected to the vehicle wheels, a plurality of frictional engagement elements for changing the torque transmission path between the input shaft and the output shaft, including the first frictional engagement element and the second frictional engagement element, hydraulic servos that engage and disengage the frictional engagement elements, a hydraulic operator which controls at least the hydraulic pressures applied to the hydraulic servos for the first frictional engagement element and the second frictional engagement element, and a control unit which receives input signals from various sensors, based on the vehicle driving state, and which outputs hydraulic control signals to the hydraulic operator. The control unit in the present invention comprises an input torque calculator which calculates an input torque, an engagement side pressure controller which controls the hydraulic pressure applied to the hydraulic servo for the first frictional engagement element, and a disengagement side pressure controller which controls the hydraulic pressure applied to the hydraulic servo for the second frictional engagement element. The disengagement side hydraulic controller sets the hydraulic pressure applied to the hydraulic servo for the second frictional engagement element in a maintain region consisting of hydraulic pressures that are higher than a base pressure, with which the second frictional engagement element has a torque capacity which is dependent upon the calculated input torque, or in a slip region consisting of hydraulic pressures that are lower than the base pressure based on the input torque.

The hydraulic pressure applied to the hydraulic servo for the second frictional engagement element is set in the maintain region at least when the input torque is a positive value, and is set in the slip region when the input torque is negative a predetermined amount below 0 input torque.

The base pressure has the minimum value when the input torque is a negative value which is a predetermined amount below 0 input torque, and the base pressure related to the input torque is continuously increased in the positive direction from the minimum value.

A difference between (1) the base pressure dependent on the input torque and (2) the hydraulic pressure set to be larger or smaller than the base pressure is increased when the input torque is increased in either a positive direction or in a negative direction.

The base pressure is set to be a value which is offset a predetermined amount from 0 input torque in the negative direction and is a hydraulic pressure calculated based on the absolute value of the input torque.

The disengagement side pressure controller comprises a corrector which corrects the hydraulic pressure for the second frictional engagement element by making it larger or smaller than the base pressure based on the amount of engine racing.

The corrector calculates the amount of engine racing based on the difference between the current input rotational speed and an input rotational speed based on the gear ratio before the up-shift, and provides a feedback control to the hydraulic pressure applied to the hydraulic servo for the second frictional engagement element based on the calculated amount of engine racing.

The hydraulic correcting amount set by the corrector is a predetermined negative value when the amount of engine racing is negative to a predetermined extent.

The engagement side pressure controller performs a servo starting control which controls the hydraulic pressure applied to the hydraulic servo for the first frictional engagement element so that the first frictional engagement element is brought to the state which immediately precedes its torque transfer, and the control performed by the disengagement side pressure controller is a disengagement side (waiting) control performed at the same time as the servo starting control.

After the servo starting control, the engagement side pressure controller executes a torque phase control which increases the hydraulic pressure applied to the hydraulic servo for the first frictional engagement element to a predetermined target pressure along a predetermined gradient.

The predetermined target pressure is the hydraulic pressure calculated based on the input torque when the input torque is a positive value, and the predetermined target pressure is a positive set value, even when the input torque is a negative value.

The disengagement side pressure controller performs an early phase control in which the hydraulic pressure applied to the hydraulic servo for the second frictional engagement element is controlled based on the hydraulic pressure in the torque phase control performed by the engagement side pressure controller. More specifically, the hydraulic pressure in the early phase control is calculated based on a torque value obtained by subtracting the engagement side transmitting torque in the torque phase control from the absolute value of the input torque.

In another aspect, the present invention includes a recording medium which is readable by a computer which, in turn, receives input signals from a hydraulic operating means which controls at least the hydraulic pressures applied to hydraulic servos for the first frictional engagement element and the second frictional engagement element and input signals from the various sensors which monitor the vehicle operating state and the computer, responsive to the input signals, outputs hydraulic control signals. The recording medium carries, encoded thereon a program including an input torque calculator which calculates an input torque for the disengagement side hydraulic controller which controls the hydraulic pressure applied to the hydraulic servo for the second frictional engagement element. The recording medium further includes, encoded thereon, a program for performing for setting the hydraulic pressure applied to the hydraulic servo for the second frictional engagement element in a maintain region consisting of hydraulic pressures that are higher than a base pressure, the set pressure providing the second frictional engagement element with a torque capacity dependent upon the calculated input torque, or in a slip region consisting of hydraulic pressures that are lower than a base pressure which is based on the input torque.

According to the invention, the shift control is performed with a common control logic, irrespective of a power on state or a power off state. Further, in the power off state, the second frictional engagement element slips and the input shaft rotational speed is reduced. Therefore, the feeling of speed reduction is avoided. Further, when the vehicle driving state is changed from the power off state to the power on state, the disengagement side pressure is quickly changed from the slip region to the maintain region thereby preventing engine racing.

The maintain region is offset the predetermined amount from 0 input torque (see FIG. 9), and the disengagement side pressure is set for a small amount of tie-up.

The disengagement side pressure is always a positive value, regardless of the input torque. Therefore, when the input torque is a negative value, the up-shift is processed in the same manner as when the input torque is a positive value.

When the vehicle driving state is changed between the power on state and the power off state during the shift, the difference between the disengagement side (waiting) pressure and the base pressure is smoothly changed. Therefore, the shift is effected smoothly without shift shock.

The base pressure is calculated based on the absolute value of the input torque. Therefore, the base pressure is calculated correctly irrespective of the power on state or the power off state. Further, the base pressure is set for a small amount of s tie-up because the base pressure is offset the predetermined amount in the negative direction.

The disengagement side (waiting) pressure is corrected based on the amount of engine racing. The amount of engine racing is calculated easily and correctly as a comparative value, and actual engine racing is minimized by the feedback control.

The amount of hydraulic pressure correction is offset to the negative side, and set for a small amount of tie-up to ensure avoidance of engine racing. The hydraulic pressure correction amount is a set a negative value when the calculated amount of engine racing is more than the predetermined amount on the negative side. Therefore, the disengagement side frictional engagement element slips and the reduction in the engine rotational speed is gentle.

Control of the disengagement side pressure in the maintain region and in the slip region, is a disengagement side (waiting) control corresponding to the servo starting control for the engagement side frictional engagement element. Therefore, in the power off state, an up-shift is executed quickly and correctly without control delay.

The up-shift is processed correctly by the torque phase control for the engagement side frictional engagement element after the servo starting control.

In the power on state, the torque phase control is performed based on the predetermined target pressure calculated based on the input torque. Therefore, correct execution of the up-shift is ensured. In the power off state, the set value is independent of the input torque. Therefore, execution of the up-shift is ensured.

The disengagement side early phase control is performed with the same timing as the engagement side torque phase control. Therefore, the up-shift is executed correctly.

The disengagement side pressure in the early phase control is calculated based on the torque calculated by subtracting the engagement side transmitting torque from the absolute value of the input torque. Therefore, the disengagement side pressure is correctly determined, irrespective of the power on state or the power off state, dependent on the engagement side pressure. Therefore, the engagement side pressure and the disengagement side pressure are balanced and an up-shift is correctly executed.

The hydraulic control in the up-shift is performed under control of a stored program, for example encoded on a recording medium such a CD-ROM.

BRIEF DESCRIPTION OF THE DRAWINGS

The invention will be described in conjunction with the following drawings in which like features are designated with like reference characters, and wherein.

DETAILED DESCRIPTION OF THE INVENTION

The invention will become more apparent from the preferred embodiments described below with reference to the accompanying drawings.

The automatic transmission comprises many frictional engagement elements such as clutches and brakes, and a planetary gear mechanism (not shown) for selectively establishing a torque transfer path through suitable engagement and disengagement of the frictional engagement elements. The input shaft of the automatic transmission mechanism is connected to the output shaft of an engine through a torque converter. The output shaft of the automatic transmission gear mechanism is connected to the drive wheels.

Figure 1:
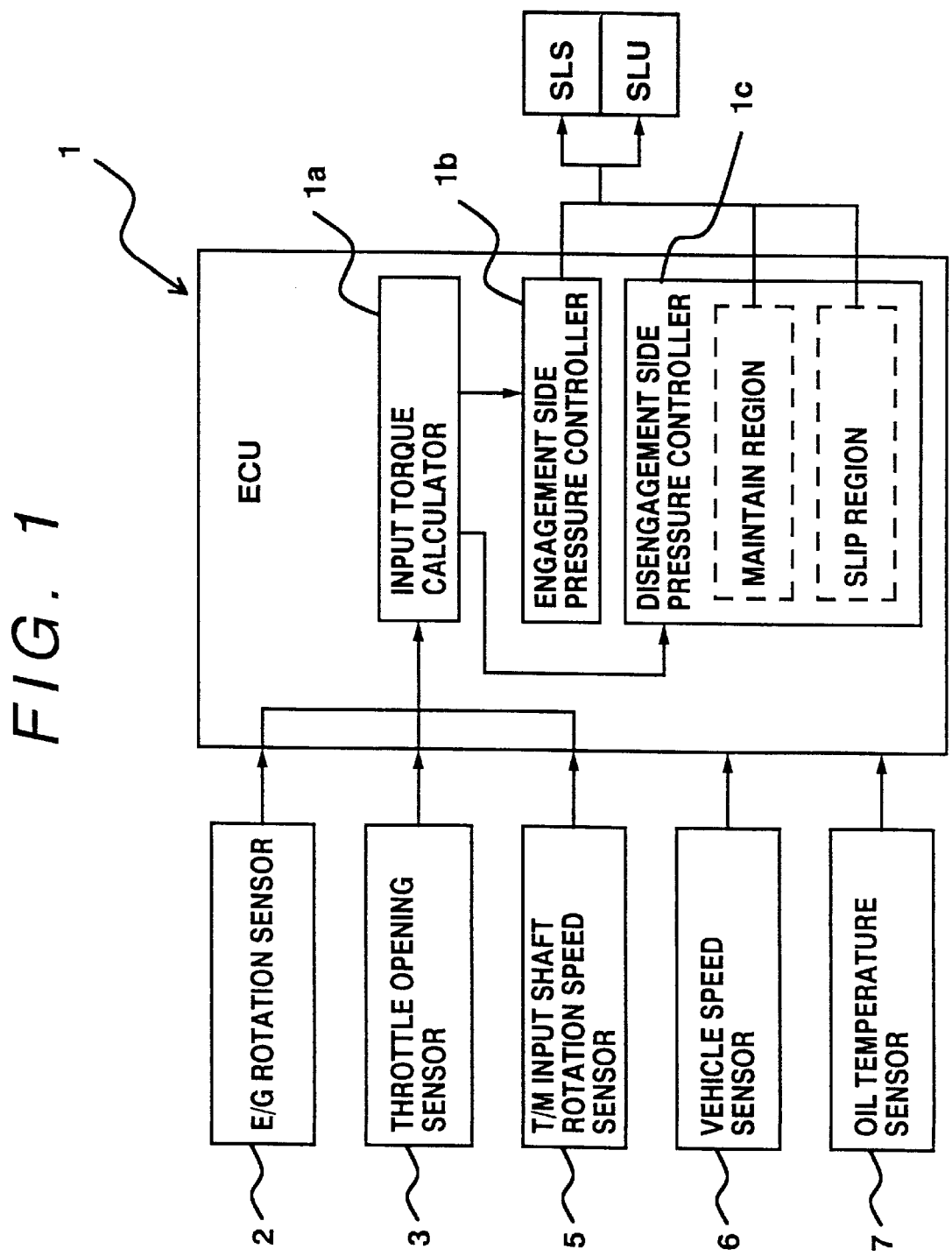
FIG. 1 is a block diagram of an electronic control circuit of the invention.

FIG. 1 is a block diagram illustrating an embodiment of an electric control circuit in the present invention. A control unit (ECU) 1 is constituted by a microcomputer and input signals from an engine rotational speed sensor 2, a throttle opening sensor 3 which detects the amount of accelerator pedal depression by a driver, an input shaft rotational speed sensor 5 which detects input shaft rotational speed (=turbine rotational speed) of the transmission (automatic transmission mechanism), a vehicle speed (=automatic transmission output shaft rotational speed) sensor 6, and an oil temperature sensor 7. Control unit 1 outputs signals to linear solenoid valves SLS, SLU in the hydraulic circuit. The control unit 1: comprises an input torque calculator 1a which calculates an input torque based on the signals from the engine rotational speed sensor 2, the throttle opening sensor 3, and the input shaft rotational speed sensor 5; an engagement side pressure controller 1b which controls a hydraulic pressure applied to a hydraulic servo for the engagement side (first) frictional engagement element; and a disengagement side pressure controller 1c which controls a hydraulic pressure applied to a hydraulic servo for the disengagement side (second) frictional engagement element. The disengagement side pressure controller 1c performs disengagement side (waiting) control by setting the hydraulic pressure applied to the hydraulic servo for the second frictional engagement element in a maintain region, i.e. hydraulic pressure higher than a base pressure, or in a slip region, i.e. a hydraulic pressure which is lower than the base pressure. The base pressure is a pressure with which the disengagement side frictional engagement element has a torque capacity related to the calculated input torque.

Figure 2:
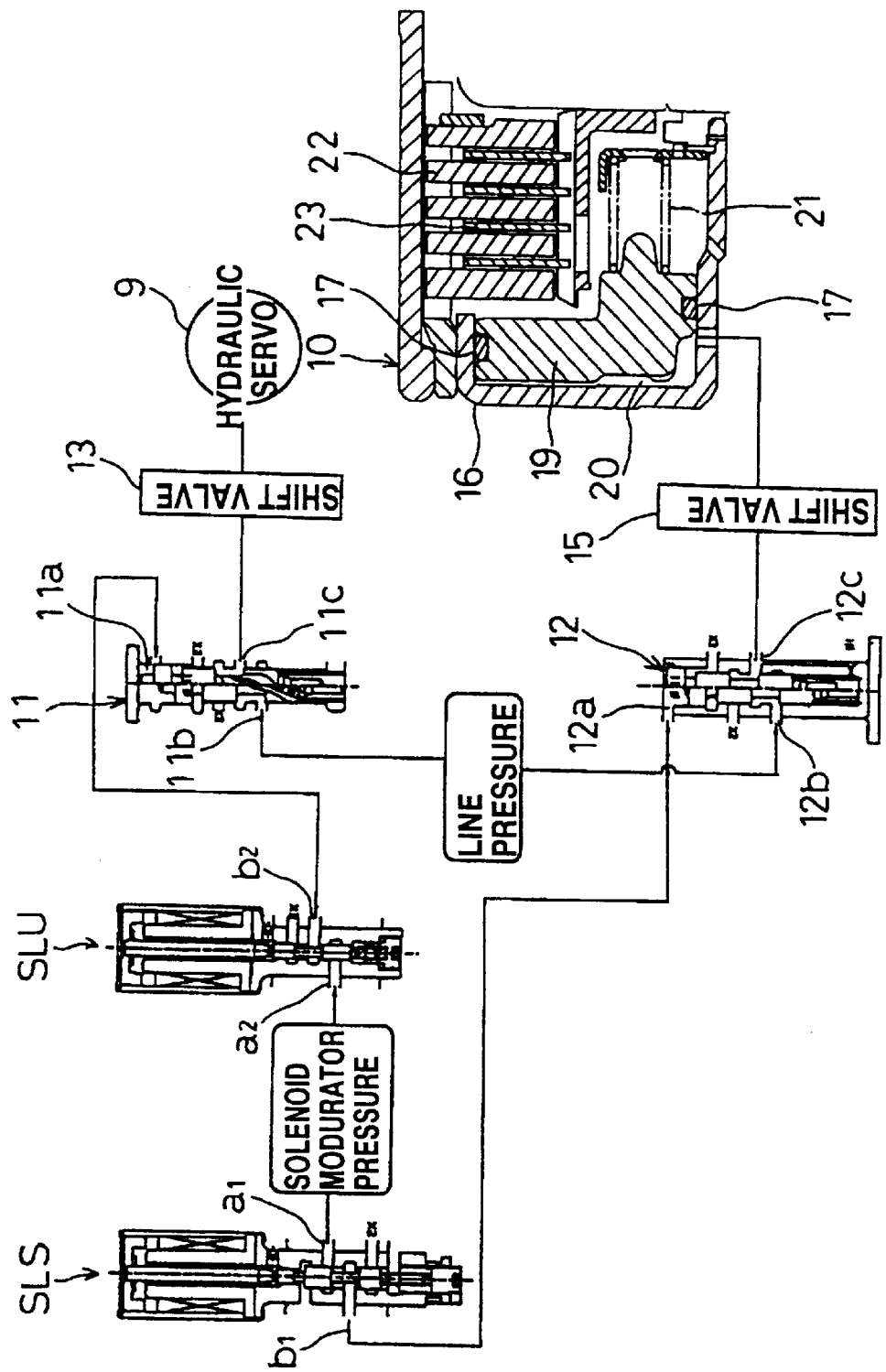
FIG. 2 is a diagram of a hydraulic circuit of the invention.

The hydraulic circuit illustrated in FIG. 2 comprises the two linear solenoid valves SLS, SLU and a plurality of hydraulic servos 9, 10 that engage and disengage a plurality of frictional engagement elements (clutches and brakes) to achieve various gear ratios. For example, four or five forward gear ratios and one reverse gear ratio may be achieved by changing over the torque transfer path through the planetary gear unit of the automatic transmission mechanism. Input ports $a_1$, $a_2$ of the linear solenoid valves SLS and SLU receive a solenoid modulator pressure. The linear solenoid valves SLS, SLU apply control pressures through their output ports $b_1$, $b_2$ to control hydraulic chambers 11a, 12a of pressure control valves 11, 12. Input ports 11b, 12b of the pressure control valves 11, 12 receive a line pressure. The output pressures, as regulated by the control pressures, are suitably applied from the output ports 11c, 12c to the hydraulic servos 9, 10 via shift valves 13, 15 respectively.

The hydraulic circuit of FIG. 2 merely serves to illustrate a basic concept thereof, and the hydraulic servos 9, 10 and the shift valves 13, 15 are shown for illustrative purposes. Actually, the automatic transmission mechanism is provided with many more hydraulic servos and shift valves for switching the hydraulic pressures to the hydraulic servos. In the each hydraulic servo, as exemplified by the hydraulic servo 10, a piston 19 is fitted in a cylinder 16 oil-tight through an oil seal 17. The piston 19 is moved against the force from a return spring 21, in accordance with the regulated pressure applied from the control valve 12 to a hydraulic chamber 20, to bring outer frictional plates 22 into contact with inner frictional members 23. Although the frictional plates 22 and members 23 are shown in the form of clutches in FIG. 2, it should be understood that brakes may be constructed and operated in a similar manner.

Figure 3:
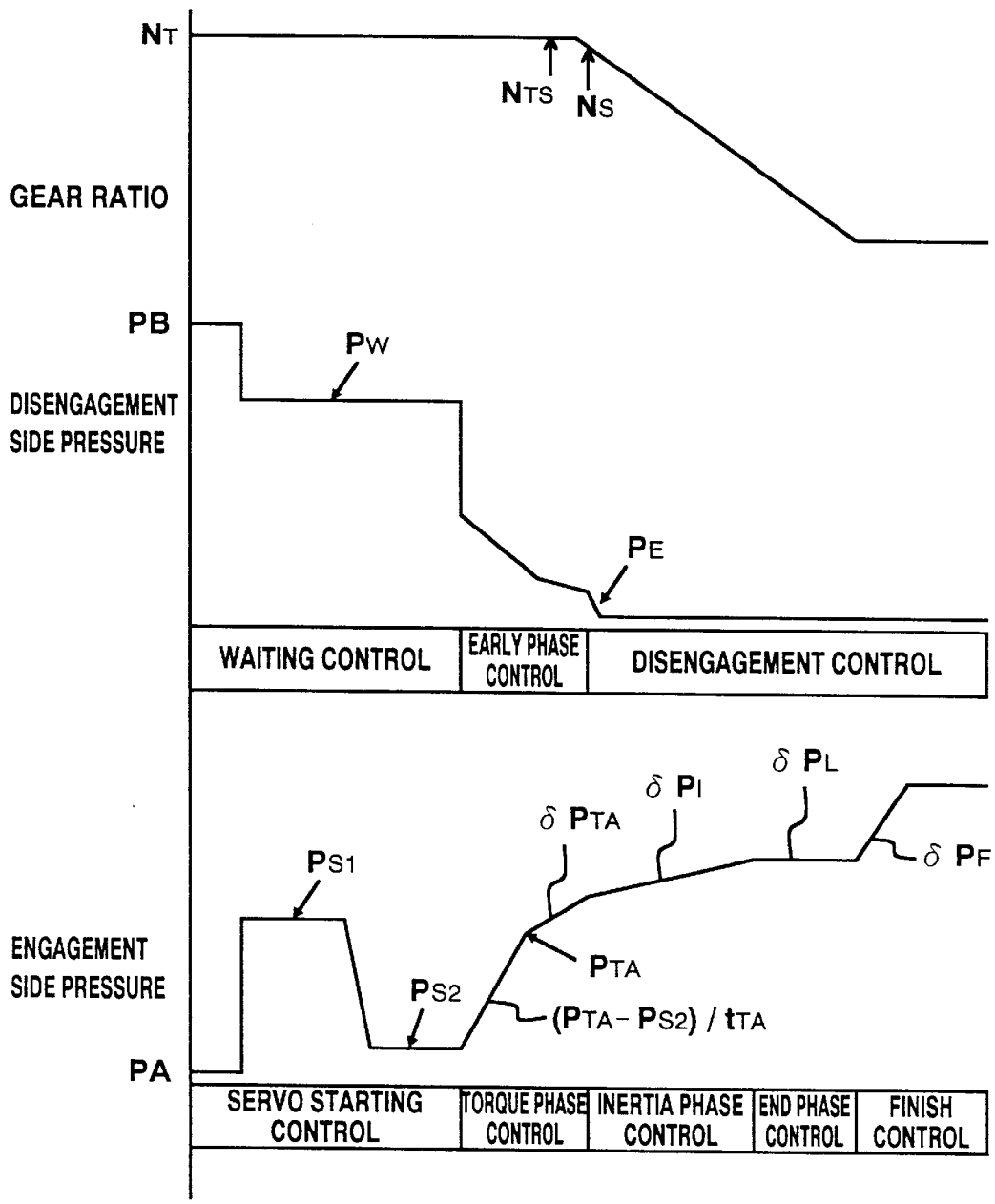
FIG. 3 is a time chart showing control signal pressures for engagement side pressure and disengagement side pressure in a power on up-shift.
Figure 4:
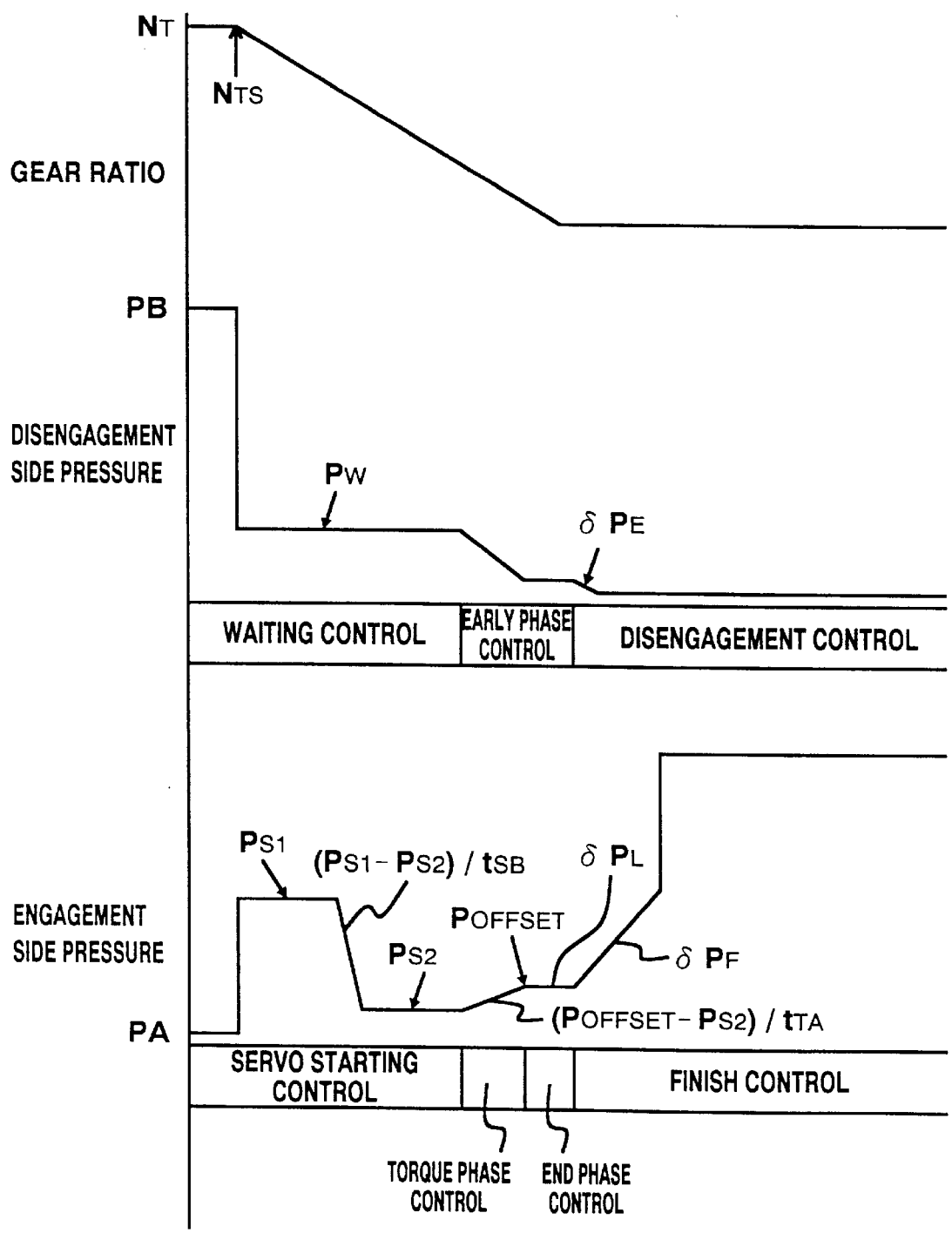
FIG. 4 is a time chart showing control signal pressures for engagement side pressure and disengagement side pressure in a power off up-shift.

An embodiment of a hydraulic control circuit of the invention will now be described with reference to FIG. 3 through FIG. 9. The hydraulic control circuit will be described with reference both to an up-shift time chart for a power on state as shown in FIG. 3 and to a power off state as shown in FIG. 4.

A shift, for example, an up-shift from second gear to third gear, is determined based on a shift map stored in the control unit 1 applying the signals from the throttle opening sensor 3 in accordance with the detected accelerator pedal operation by the driver and the vehicle speed sensor 6. After a predetermined time for preparation operations for a predetermined shift valve has elapsed, shift controls for engagement side pressure PA and disengagement side pressure PB are started. The engagement side pressure control will be described with reference to FIG. 6 and FIG. 7. At step S1, a timer is started at the same time the shift control starts. At step S2, a predetermined signal pressure is output to the linear solenoid valve SLS (or SLU) so that the engagement side pressure PA applied to the engagement side hydraulic servo is brought to a predetermined pressure $P_{S1}$. The predetermined pressure (pressure limit) $P_{S1}$ is set to fill up the hydraulic chamber 20 of the hydraulic servo, and is maintained for a predetermined time $t_{SA}$. At step S3, after lapse of the predetermined time $t_{SA}$, at step S4, the engagement side pressure PA is decreased over time with a predetermined rate of decrease (hereinafter referred to as "sweep down") $[(P_{S1}-P_{S2})/t_{SB}]$. When the engagement side pressure PA has decreased to a predetermined low pressure $P_{S2}$ at step S5, the sweep-down is stopped, and the engagement side pressure PA is maintained (in stand-by) at the predetermined low pressure $P_{S2}$ in step S6. The predetermined low pressure $P_{S2}$ is set to be higher than a piston stroke pressure so that there is no rotational speed change at the input shaft. At step S7, the predetermined low pressure $P_{S2}$ is maintained until lapse of a time t which equals a predetermined time $t_{SE}$.

Steps S2 through S7 describe a servo starting control. In the servo starting control, an engagement side hydraulic piston is extended to reduce the clearances within the engagement side frictional engagement element, thereby preparing for the actual up-shift in which the torque allotted to the engagement side frictional engagement element and the rotational speed are changed.

At step S8, an engagement side allotment torque TA is calculated based on the input torque $T_T$ (=turbine torque) as follows. First, the engine torque is determined by a linear interpolation based on the throttle opening and the engine rotational speed applied to a map selected in accordance with the vehicle driving state. A speed ratio is then calculated based on the input and output rotational speeds of the torque converter. A torque ratio is determined from a map based on the speed ratio. Then, the input torque $T_T$ is determined by multiplying the engine torque by the torque ratio. The engagement side allotment torque TA is then calculated based on a torque allotment ratio 1/a and the input torque $T_T$ ($T_A=1/a*T_T$).

In step S9, a target engagement pressure $P_{TA}$, which establishes the input rotational speed $N_T$ (the speed just before the start of an inertia phase), is calculated based on a predetermined function $P_{TA}=f_{TA}(TA)$ which is changed in accordance with the engagement side allotment torque $T_A$. Thus, the target pressure $P_{TA}$ is calculated based on the formula $P_{TA}=(T_A/A_A)+B_A+dP_{PA}$, wherein $B_A$ is the piston stroke pressure (=spring load), $A_A$ is effective radius of the frictional engagement element (piston area X a constant X coefficient of friction) and $dP_{TA}$ is an increment of hydraulic pressure set for delay of application of a hydraulic pressure. When the vehicle driving state is power on, the target engagement pressure $P_{TA}$ is calculated based on the input torque $T_T$. When the vehicle driving state is power off and the target engagement pressure $P_{TA}$ is lower than a predetermined pressure $P_{OFFSET}$, the target engagement pressure is set to be the predetermined pressure $P_{OFFSET}$. Therefore, the execution of the shift is assured, as described later with reference to FIG. 11. At step S10, the target engagement pressure $P_{TA}$ is corrected based on tie-up values $S_{11}$, $S_{12}$. The tie-up values $S_{11}$, $S_{12}$ are calculated based on map values and learned values. That is to say, the tie-up values $S_{11}$, $S_{12}$ are set based on throttle opening/vehicle speed maps for various oil temperatures. The tie-up values are corrected to eliminate unnecessary engine racing.

At step $S_{11}$, a gradient $(P_{TA}P_{S2})/t_{TA}$ is calculated based on the target engagement pressure $P_{TAE}$ which, in turn, is calculated based on the input torque $T_T$ and which takes the engagement side frictional engagement element to the state which immediately precedes the inertia phase start, and a predetermined time $t_{TA}$. The engagement side pressure PA is increased over time with a predetermined rate of increase (hereinafter "sweep up").

At step S12, in accordance with the first sweep-up having a comparatively steep gradient, the engagement side torque is increased and the engagement side pressure PA is increased to the state which immediately precedes the start of the input shaft rotational speed change, that is to say, to the engagement target pressure $P_{TA}$. In the power off state, the predetermined pressure $P_{OFFSET}$ is brought to the target engagement pressure. Then, the engagement side pressure PA undergoes sweep-up with the predetermined gradient $[(P_{OFFSET}-P_{S2})/t_{TA}]$.

At step S13, when the engagement side pressure PA increases to the target engagement pressure $P_{TA}$ (or $P_{OFFSET}$), that is to say, when the inertia phase begins, i.e. when the input shaft rotational speed $N_T$ begins to change, rate of change $\delta P_{TA}$ of the engagement side pressure PA is calculated based on a predetermined function: $\delta P_{TA}=f\delta P_{TA}(\omega a')$ wherein $\omega a'$ is a target rotational change rate $d\omega s/dt$ that is set as a target when the input shaft rotational speed $N_T$ begins to change. Thus, the rate of change $\delta P_{TA}$ of the engagement side pressure PA is calculated as $\delta P_{TA}=(I*\omega a')/(k*t_{aim})$, wherein k is a constant, $t_{aim}$ is a target shift start time, and I is the amount of inertia. Then the engagement side pressure PA undergoes sweep-up with the gradient of $\delta P_{TA}$ at step S14. The second sweep-up is continued until a rotational change amount $\Delta N$ is increased to a rotational speed $dN_s$ for detecting a predetermined shift start at step S15. The rotational change amount $\Delta N$ is the change from input rotational speed $N_{TS}$ at the start of the rotational speed change.

Steps S8 through S14 describe the torque phase control. In torque phase control, the torque allotted to the engagement side frictional engagement element is increased, the torque allotted to the disengagement side frictional engagement element is decreased, and the gear ratio is that before the up-shift (second ratio). Only the torque allotment is changed.

Figure 11:
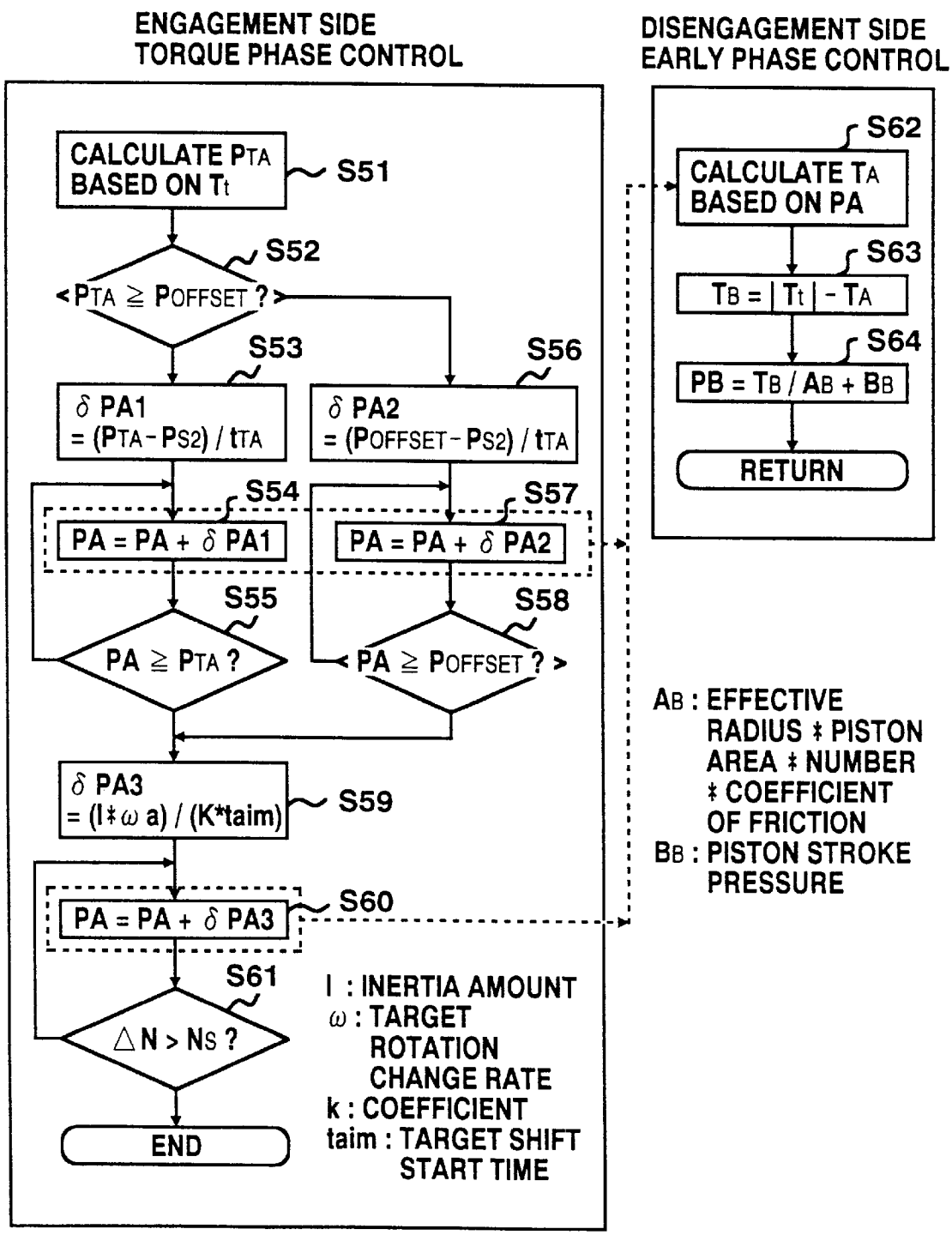
FIG. 11 is a flow chart of a routine for torque allotment in engagement side torque phase control and disengagement side early phase control.

The torque allotment in the engagement side torque phase control is described later with reference to FIG. 11. In the power off state, the input torque is a negative value and the input rotational speed has already been changed by the disengagement control for the disengagement side pressure PB. That is to say, step 14 is already satisfied. Therefore, step 13 and step 14 are not executed. Further, the input rotational speed $N_T$ is already changed to that for a high gear ratio (for example, third gear ratio). Therefore, step 16 is skipped and not actually executed.

The start of change of the input shaft rotational speed $N_T$ is the start of the inertia phase, that is to say, a state in which a shift (shift from second gear to third gear) is started, i.e. the input shaft rotational speed relative to the output shaft rotational speed and the gear ratio starts to change. The start of change of the input shaft rotational speed $N_T$ is detected here based on signals from the input shaft rotational speed sensor 5 and the vehicle speed sensor. However, the detection of start of the input shaft rotational speed $N_T$ is not limited to detection of a change in the gear ratio (inertia phase start). It is possible to detect the rotational change in the torque phase because the change of the input shaft rotational speed $N_T$ related to the change in the torque allotment has started.

An engagement side pressure change $\delta P_I$ is set by a feedback control based on the amount of rotational change $\Delta N$ which, in turn, is based on the values detected by the input shaft rotational speed sensor 5. Then the engagement side pressure PA undergoes sweep-up with the gradient $\delta P_I$ at step S16. That sweep-up with the gradient $\delta P_I$ is continued until a(1)%, for example, 70% of the rotational change amount $\Delta N$ at shift end, is reached at step S17. In other words, the sweep-up with the gradient $\delta P_I$ is continued until $(\Delta N*100)/(N_{TS}/g_i)*(g_i-g_{i+1})$ becomes a(1)%, wherein $N_{TS}$ is the input shaft rotational speed at the shift start, $\Delta N$ is the amount of rotational speed change, $g_i$ is the gear ratio before the shift, and $g_{i+1}$ is the gear ratio after the shift. The feedback control of steps S16 and S17 is the inertia phase control. The torque capacity of the engagement side frictional engagement element increases more than the engine torque. The difference between the input torque determined by the engagement side torque capacity and the actual engine torque becomes a load on the engine, thereby reducing the engine rotational speed.

After a(1)% of the rotational change amount $\Delta N$, a hydraulic pressure change $\delta P_L$, which is different from the gradient $\delta P_I$, is set by a feedback control based on a smooth input shaft rotational speed change amount $\Delta N$. Then the engagement side pressure PA is swept-up with the gradient $\delta P_L$ at step S18. Generally, the gradient $\delta P_L$ is a little more gentle than the gradient $\delta P_I$. That sweep-up is continued until reaching a(2)%, for example 90% of the amount of rotational change $\Delta N$ at approximately the shift end at step S19. The target shift times for the sweep-ups with the gradient $\delta P_I$ and the gradient $\delta P_L$ are set based on a throttle-opening/vehicle speed map which is selected according to oil temperature.

After the target shift time has elapsed, a race time $t_F$ is set at step S20. The state at that time approximately corresponds to the state wherein the inertia phase is ended. Further, a hydraulic pressure change rate $\delta P_F$ which is comparatively steep is set, and the engagement side pressure PA is swept-up with the steep gradient $\delta P_F$ at step S21. After a predetermined time $t_{FE}$, which is set to be sufficient to increase the engagement pressure, has elapsed from the race time $t_F$ at step S22, the engagement side pressure control is ended.

Figure 8:
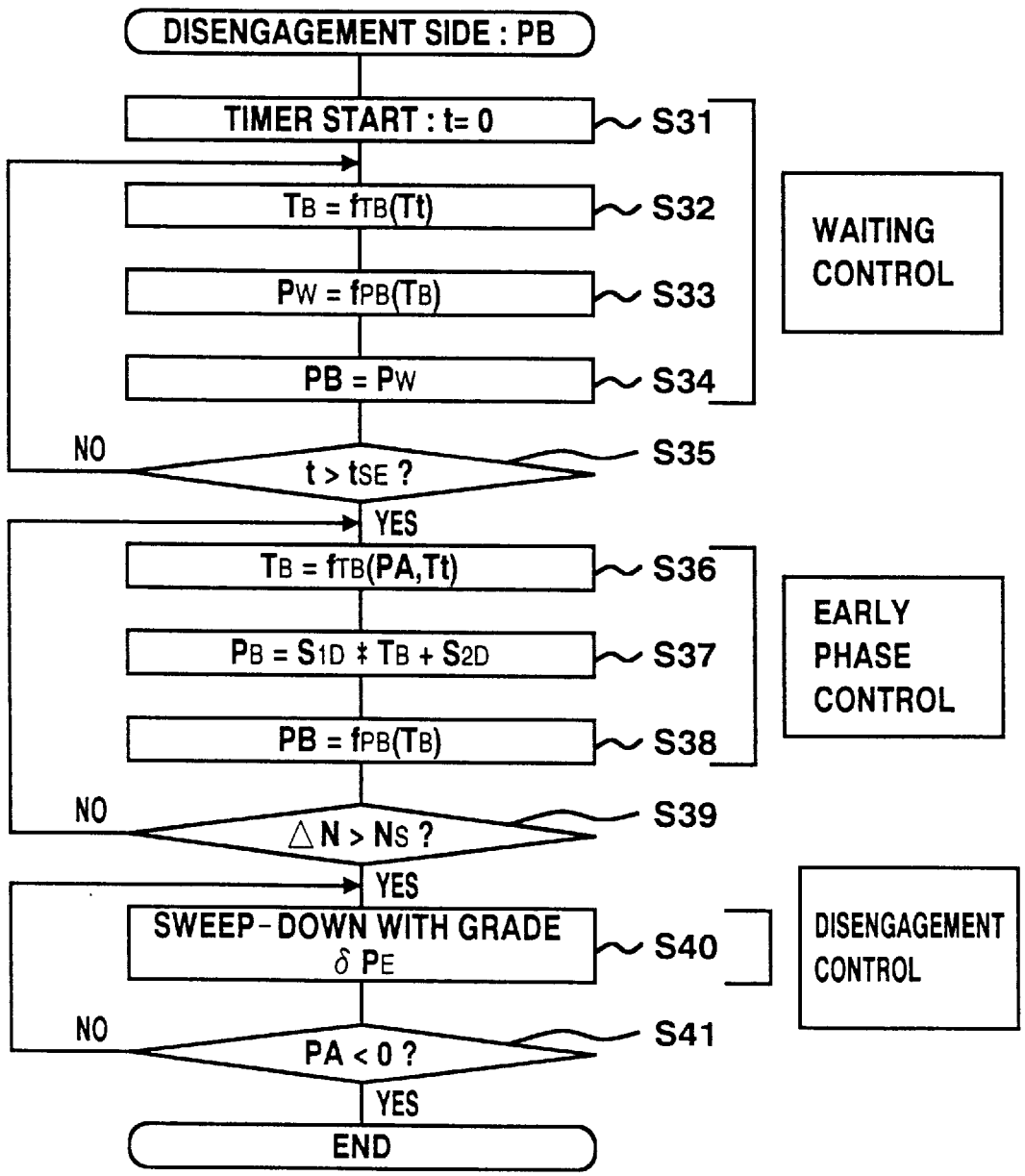
FIG. 8 is a flow chart of a routine for disengagement side control in an up-shift.

Control of the disengagement side pressure PB in the up-shift will now be described with reference to FIG. 8. At step 31, a timer for the disengagement side pressure control is started, at the same time the engagement side pressure control is started, by a shift command from the control unit 1. At that time, the disengagement pressure PB is the high pressure needed for engagement. A disengagement side input torque $T_B$ is calculated based on the input torque $T_t$ at step S32. In this state, the automatic transmission is in a low gear ratio (for example, second gear) which precedes the up-shift and almost all of the input torque is provided by the disengagement side frictional engagement element. A disengagement side input torque $T_B$ based on the low gear ratio is calculated.

Figure 9:
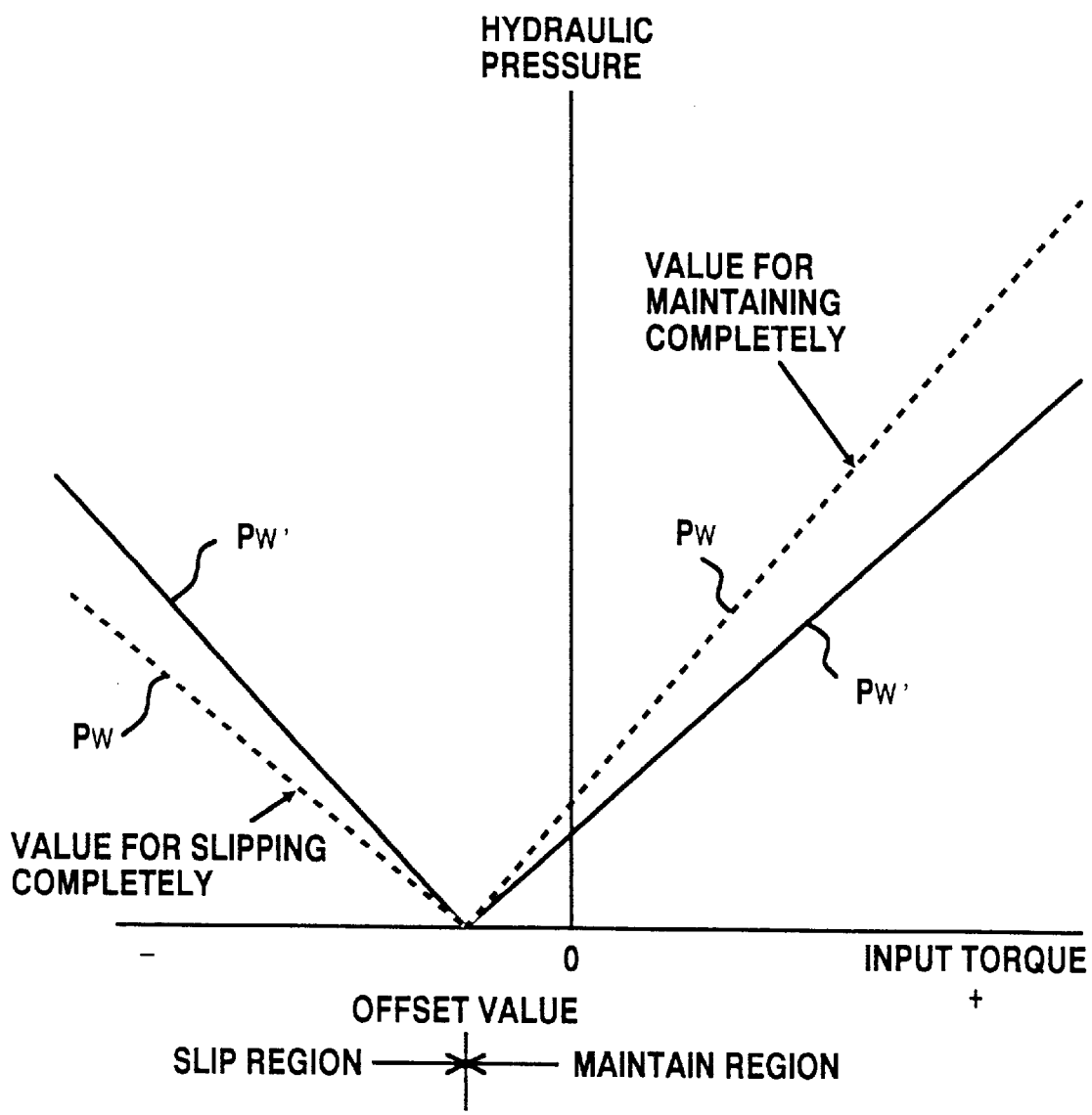
FIG. 9 is a graph of hydraulic pressure in disengagement side (waiting) control.

At step 34, the disengagement side pressure PB is set to the calculated disengagement side (waiting) pressure $P_W$ based on the disengagement side input torque $T_B$. As shown in FIG. 9, the disengagement side (waiting) pressure $P_W$ is set as follows. A base pressure $P_W'$, with which the disengagement side frictional engagement element has a torque capacity corresponding to the disengagement side input torque $T_B$, is first calculated. The base pressure $P_W'$ is that which provides the disengagement side frictional engagement element with a limited torque capacity for no slip, i.e. with the input torque $T_B$. The base pressure $P_W'$ is calculated based on the absolute value of the input torque $T_T$. The base pressure $P_W'$ is set for a small amount of tie-up to prevent engine racing. That is to say, the base pressure $P_W'$ is offset to the negative side by a predetermined amount. As shown in FIG. 9, when the input torque is on the positive side of the offset value, the disengagement side (waiting) pressure $P_W$ is set to be larger than the base pressure $P_W'$. On the other hand, when the input torque is on the negative side of the offset value, the disengagement side (waiting) pressure $P_W$ is set to be smaller than the base pressure $P_W'$. That is to say, on the positive side of the offset value, the disengagement side frictional engagement element has a torque capacity which is larger than a torque capacity corresponding to the input torque, and is completely engaged and maintained. This is the "maintain region". On the negative side of the offset value, the disengagement side frictional engagement element has a torque capacity which is smaller than the torque capacity corresponding to the input torque, and is in a slipping mode. This is the slip region. When the input torque increases to the positive side or to the negative side from the offset value, the difference between the base pressure $P_W'$ and the disengagement side (waiting) pressure $P_W$ increases linearly.

Figure 10:
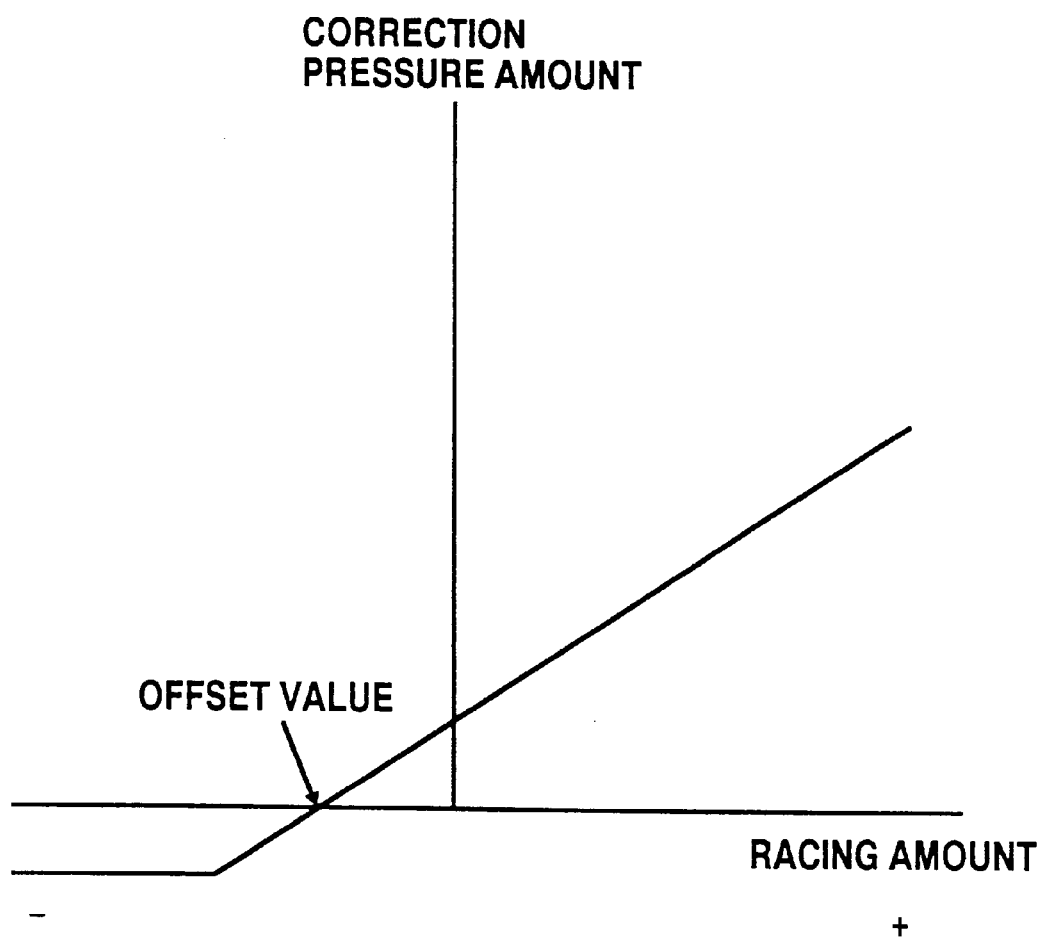
FIG. 10 is a graph of the amount of hydraulic pressure correction versus engine racing.

The disengagement side (waiting) pressure $P_W$ is corrected based on the amount of engine racing as shown in FIG. 10, the amount of engine racing being determined as follows. When the input shaft rotational speed (or engine rotational speed) is determined to be larger than the rotational speed in the low gear ratio (for example, second gear), i.e. the gear ratio before the up-shift which is calculated from the input rotational speed relative to the output rotational speed, it is determined that there is engine racing. Then, the difference between the current input shaft rotational speed and the rotational speed (input shaft rotational speed to the gear ratio) calculated by multiplying the low gear ratio and the current output shaft rotational speed is the amount of engine racing. Then, as shown in FIG. 10, a correction pressure is determined based on the amount of engine racing, and the disengagement side (waiting) pressure $P_W$ is adjusted by feedback control based on the amount of engine racing. The increment of correction pressure is set to provide a small degree tie-up and an predetermined offset value is set to prevent engine racing. When the amount of engine racing is negative more than a predetermined value, the increment of correction pressure is set as a predetermined negative value. Therefore, when the input torque is a negative value, the disengagement side frictional engagement element slips and the reduction in the engine rotational speed is gentle.

The disengagement side (waiting) pressure $P_W$ is maintained until the predetermined time $t_{SE}$ as measured by the timer t, has elapsed for synchronizing with the servo starting control for the engagement side frictional engagement element at step S35. Steps 31 through 34 relate to disengagement side (waiting) control. Therefore, in the power on state as shown in FIG. 3, the disengagement side (waiting) pressure is set to be larger than the base pressure $P_W'$ related to the input torque (maintain region) because the input torque $T_t$ is a positive value. Then, the disengagement side frictional engagement element is maintained in the engagement state so that the automatic transmission is maintained in the low gear ratio (for example, second gear), in wait for the torque phase control of the engagement side frictional engagement element. In the power off state as shown in FIG. 4, the disengagement side (waiting) pressure $P_W$ is made to be lower than the base pressure $P_W'$ related to the input torque (slip region). Then, the disengagement side frictional engagement element slips and the input shaft rotational speed $N_T'$ is reduced based on power off. Then, the shift to the higher gear ratio (for example, third ratio) is effected.

A temporary disengagement side torque $T_B'$ is calculated as function of the engagement side pressure PA and the input torque $T_T$, i.e. $T_B'=f_{TB}(PA, T_T)$, at step S36. Further, the disengagement side torque $T_B$ is calculated as a function of tie-up amounts $S_{1D}$, $S_{2d}$, i.e. $T_B=S_{1D}*T_B+S_{2D}$, in step S37. Then, the disengagement side pressure PB is calculated based on the disengagement side torque $T_B$, i.e. $PB=f_{PB}(T_B)$, at step S38. That is to say, the allotment torque $T_A$ for the engagement side frictional engagement element is calculated as: $T_A=A_A*(PA-B_A)$ wherein $A_A$ is the effective radius X a piston area X a constant X the coefficient of friction and $B_A$ is the piston stroke pressure. The temporary disengagement side torque $T_B'$ allotted to the disengagement side frictional engagement element is calculated by the formula $T_B'=(1/b)T_T-(a/b)T_A$, wherein 1/b is the torque allotment for the disengagement side, 1/a is the torque allotment for the engagement side, and $T_T$ is the input shaft torque. Then, the extent of tie-up with the engagement side frictional engagement element is set based on the tie-up amounts $S_{1D}$, $S_{2D}$ in consideration of driving comfort, and the disengagement side torque $T_B$ is calculated as: $T_B=S_{1D}*T_B+S_{2D}$. The tie-up amounts $S_{1D}$, $S_2D$ are set based on the throttle opening/vehicle speed map selected from among many maps based on the oil temperature so that the driver will be satisfied with the feel of the shift. Further, the disengagement side pressure PB is calculated based on the disengagement side torque TB in consideration of the tie-up amounts by the formula: $P_B=(T_B/A_B)+B_B$, wherein $A_B$ is the effective radius of the frictional engagement element on disengagement side X a piston area X a constant X coefficient of friction and $B_B$ is the piston stroke pressure on the disengagement side. In the calculation of the disengagement side torque $T_B$, the absolute value $T_t$ is used. Therefore, the disengagement side pressure is always a positive value.

Because the sweep-down of the disengagement side pressure PB calculated as above is dependent on the engagement side pressure PA, the sweep-down has two different gradients which meet at the inertia phase start ($t_{TA}$) at which the input shaft rotational speed change is started. That is to say, the sweep-down consists of a sweep-down having comparatively steep gradient corresponding to the first sweep-up of the engagement side pressure and a sweep-down having comparatively gentle gradient corresponding to the second sweep-up of the engagement side pressure. Then, the sweep-down is continued until the amount of the input shaft rotational speed change $\Delta N$ reaches the predetermined start detection rotational speed $N_S$ at step S39.

Steps S36 through S38 relate to the early phase control and correspond to the torque phase control (in power on state) or the torque phase control+an end phase control (in power off state) for the engagement side. Then, a change $\delta P_E$ of the disengagement side pressure is set, and the disengagement side pressure PB is swept-down with the gradient of the hydraulic pressure change at step S40. The sweep-down is continued until the disengagement side pressure PB is decreased to 0 at step S41. Then, the disengagement side pressure control is ended. Step S40 is a disengagement control and corresponds to the inertia phase control+the end phase control+an finish control (in power on state) or the finish control (in power off state).

The torque allotment control in the engagement side torque phase control and the disengagement side early phase control will now be described with reference to FIG. 11. The target engagement pressure $P_{TA}$ based on the input torque $T_t$ is calculated, the same as in steps S8, S9, in step S51. The target engagement pressure $P_{TA}$ is compared with the predetermined pressure $P_{OFFSET}$ at step S52. The predetermined pressure $P_{OFFSET}$ is set to be a value with which the shift can be executed in a case wherein the input torque is small and the shift would not conventionally be executed. In the power on state, when the target engagement pressure $P_{TA}$ is larger than the predetermined pressure $P_{OFFSET}$, a predetermined (first) sweep gradient $\delta PA1=(P_{TA}-P_{S2})/t_{TA}$ is calculated based on the target engagement pressure $P_{TA}$, the predetermined time $t_{TA}$, and the predetermined low pressure $P_{S2}$ at step S53. Then, the engagement side pressure PA is swept-up with the first sweep gradient $\delta P_{A1}$ at step S54. The sweep-up is continued until the engagement side pressure PA is increased to the target engagement pressure $P_{TA}$ at step S55.

In the power off state, when the target engagement pressure $P_{TA}$ is smaller than the predetermined pressure $P_{OFFSET}$, a predetermined sweep gradient $\delta PA2 =(P_{OFFSET}-P_{S2})/t_{TA}$ is calculated based on the predetermined pressure $P_{OFFSET}$, the predetermined time $t_{TA}$, and the predetermined low pressure $P_{S2}$ at step S56. Then, the engagement side pressure PA is swept-up with the predetermined sweep gradient $\delta PA2$ at step S57. The sweep-up is continued until the engagement side pressure PA is increased to the predetermined pressure $P_{OFFSET}$ at step S58.

Then, when the engagement side pressure PA increases to the target engagement pressure $P_{TA}$ or the predetermined pressure $P_{OFFSET}$, as shown in step S13, a second sweep gradient $\delta PA3$ is calculated as a function of the target rotational speed change rate (gradient of change of input shaft rotational speed) $\omega a'$ at the start of the change in input shaft rotational speed at step S59. That is to say, $\delta PA3=(I*\omega a')/(k*t_{aim})$ wherein k is a constant, $t_{aim}$ is a target change start time, and I is amount of inertia. Then the engagement side pressure PA is swept-up with the second sweep gradient at step S60. The second sweep-up is continued until the amount of rotational speed change $\Delta N$ is increased to the rotational speed change $dN_S$ for detecting the predetermined shift start at step S61. The target change start time $t_{aim}$ is set as a function of the input shaft rotational speed $N_T$.

In the disengagement side early phase control, at step S62, the engagement side torque $T_A$ allotted to the engagement side frictional engagement element is calculated based on the engagement side pressure PA calculated at step S54, S57 or S60.

Then, the disengagement side torque $T_B[=|T_T|-T_A]$ is calculated by subtracting the engagement side torque $T_A$ from the absolute value of the input torque $T_T$ at step S63. Further, the disengagement side pressure $PB[=(T_B/A_B)+B_B]$ is calculated based on the disengagement side torque $T_B$, a coefficient $A_B[$=effective radius X piston area X constant X coefficient of friction$]$, and the piston stroke pressure $B_B$ at step S64. The calculated disengagement side pressure $P_B$ is dependent on the engagement side pressure PA in the engagement side torque phase control, and is set to follow the torque phase control.

Figure 5:
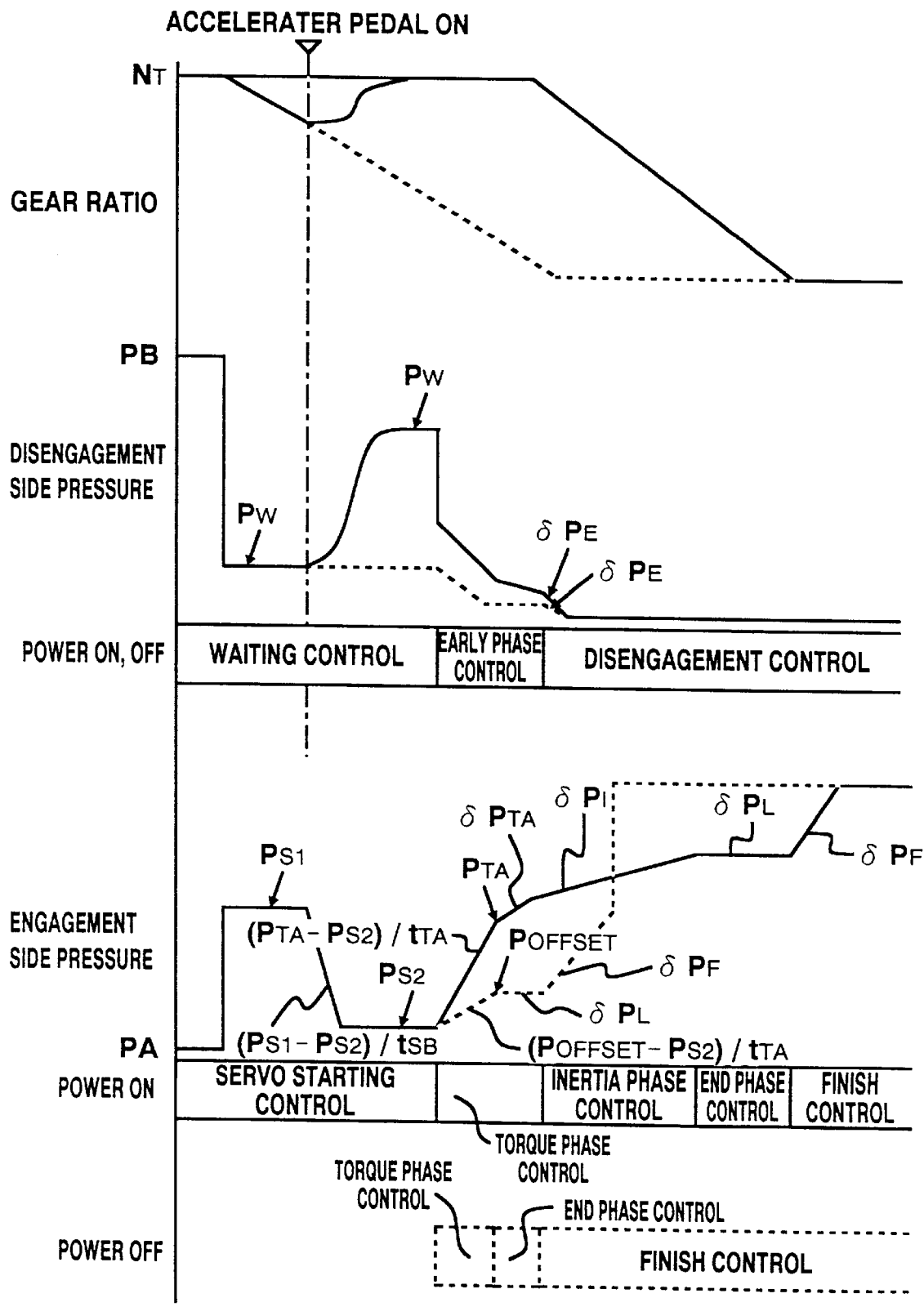
FIG. 5 is a time chart showing control signal pressures when the driving state is changed from power off state to power on state.
Figure 6:
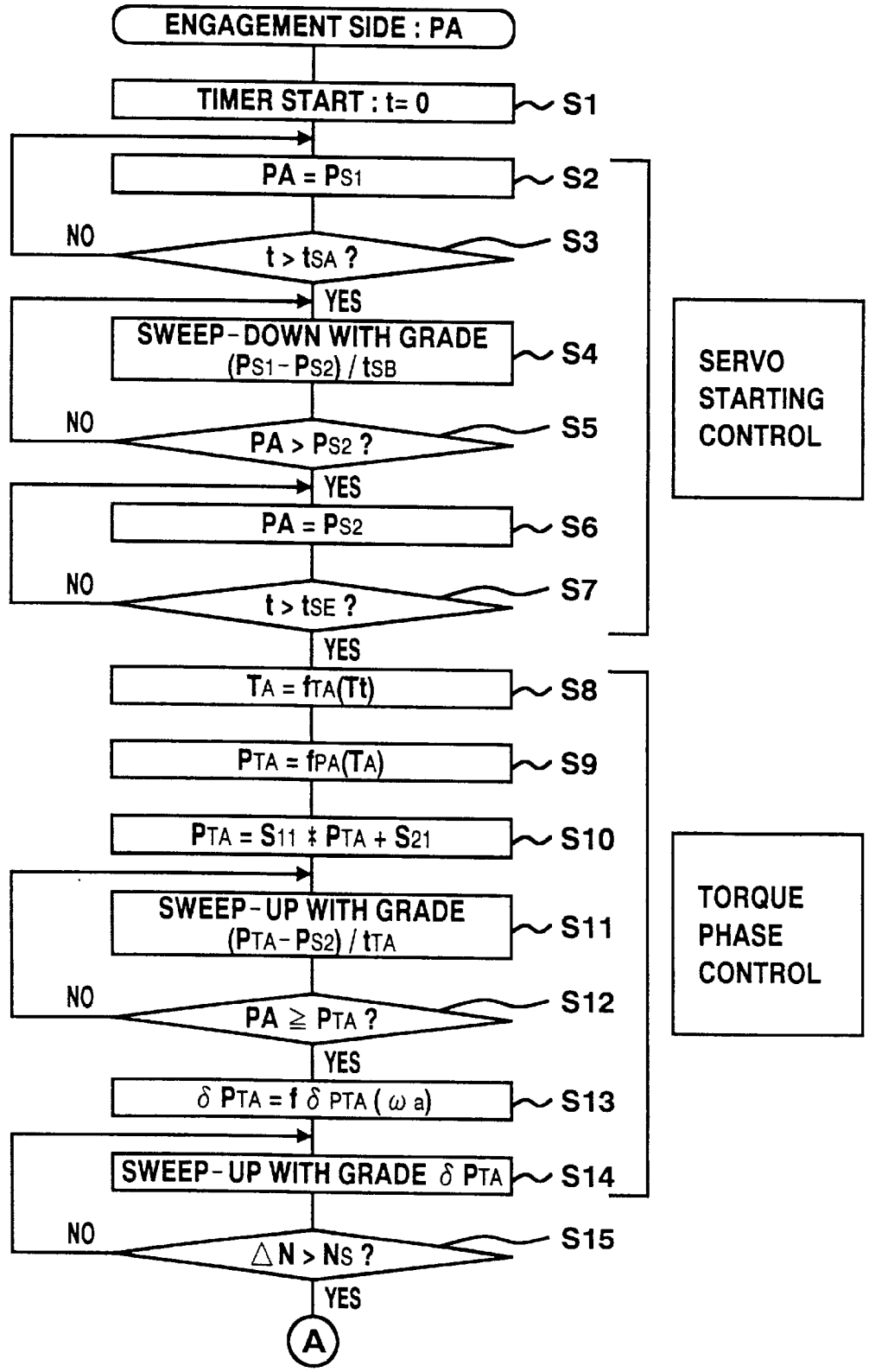
FIG. 6 is a flow chart showing engagement side control in an up-shift.
Figure 7:
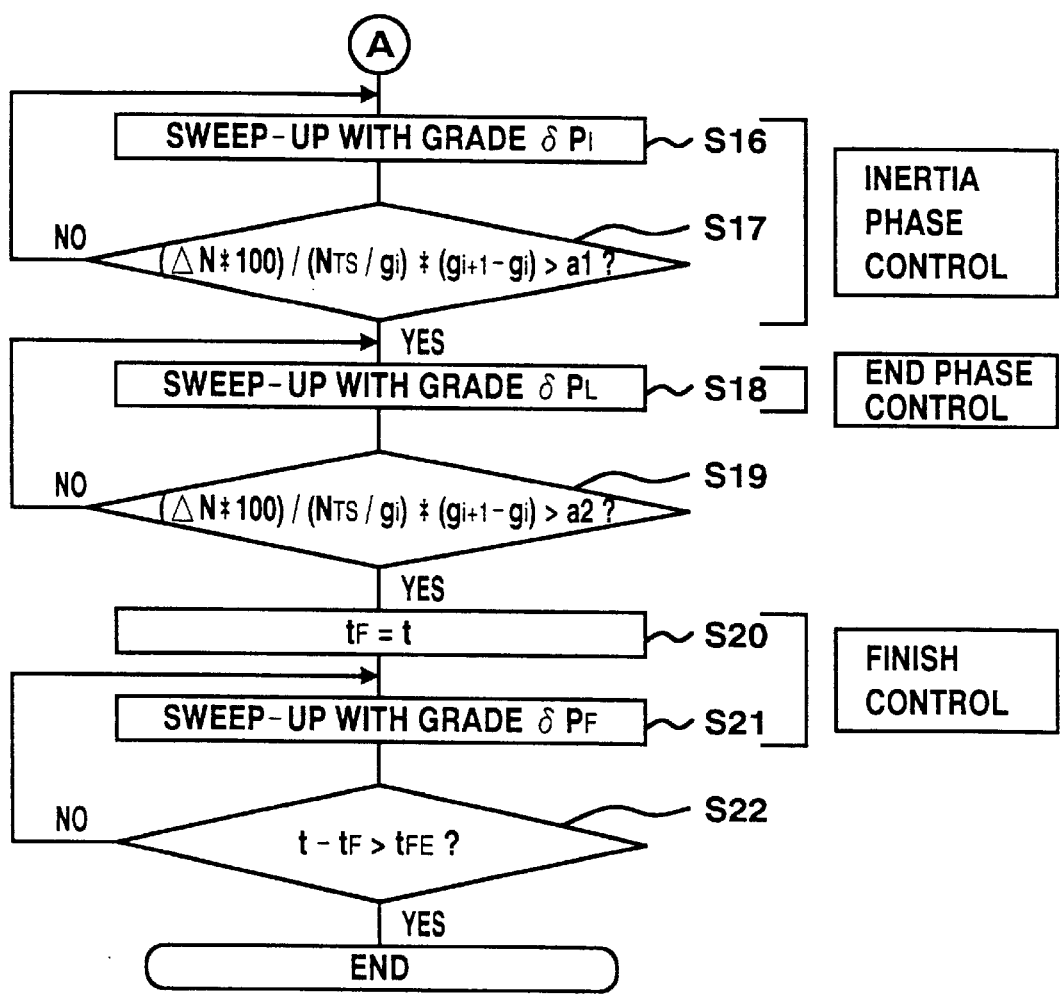
FIG. 7 is a continuation of the flow chart of FIG. 6.

Change of the vehicle drive state from the power off state to the power on state by depression of the accelerator pedal during the disengagement side (waiting) control will now be described with reference to FIG. 5. In the power off state, as shown in FIG. 9, the disengagement side (waiting) pressure $P_W$ is in the slip region and the input rotational speed $N_T$ is reduced. After that, because of the change to the power on state, the disengagement side (waiting) pressure $P_W$ is increased following the increase of the input torque $T_t$, and is in the maintain region. Therefore, the input rotational speed $N_T$ is increased and the lower gear ratio (for example, second gear) is maintained. Then, when the disengagement side (waiting) control and the servo starting control are ended and the early phase control (disengagement side) and the torque phase control (engagement side) are started upon lapse of the predetermined time $t_{SE}$, the engagement side pressure PA is increased with the sweep gradient based on the target engagement pressure $P_{TA}$ and the target rotational speed change rate ωa'. Then, the disengagement side pressure PB is decreased in dependence on the engagement pressure PA. Further, the control is continued the same as in the power on state shown in FIG. 3. In FIG. 5, dotted lines show the power off state.

Figure 12:
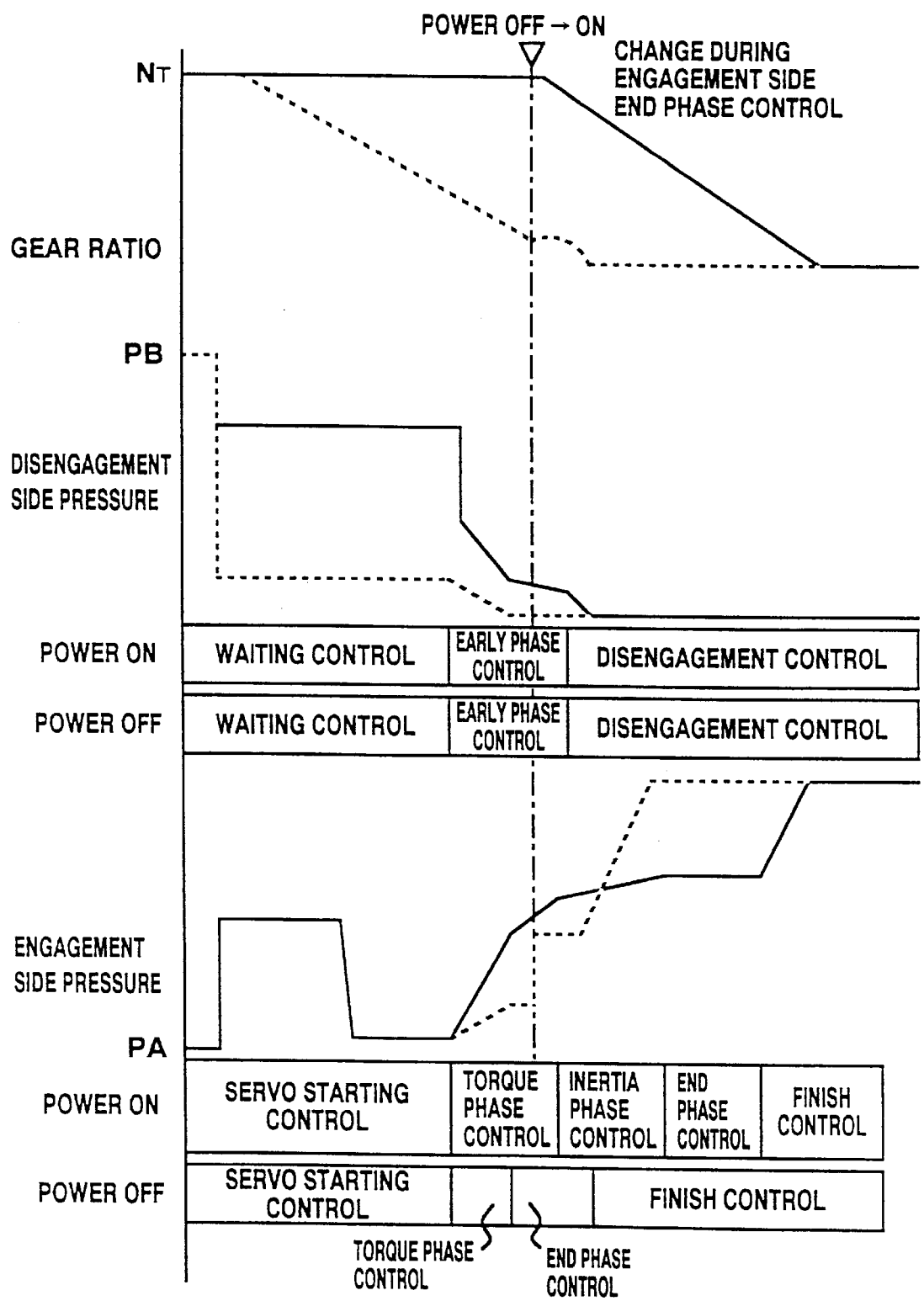
FIG. 12 is a time chart showing control signal pressures when the driving state is changed from power off state to power on state during engagement side end phase control.

Further, FIG. 12 shows a state of change in which the vehicle driving state from power off to power on during the engagement side end phase control. In the power off state, the disengagement side frictional engagement element slips and the input rotational speed $N_T$ is reduced. In that state, when the input torque $T_t$ is increased because of the change to the power on state, the engagement side pressure PA based on the input torque is increased and is controlled by a feedback control based on the input shaft rotational speed change.

Figure 13:
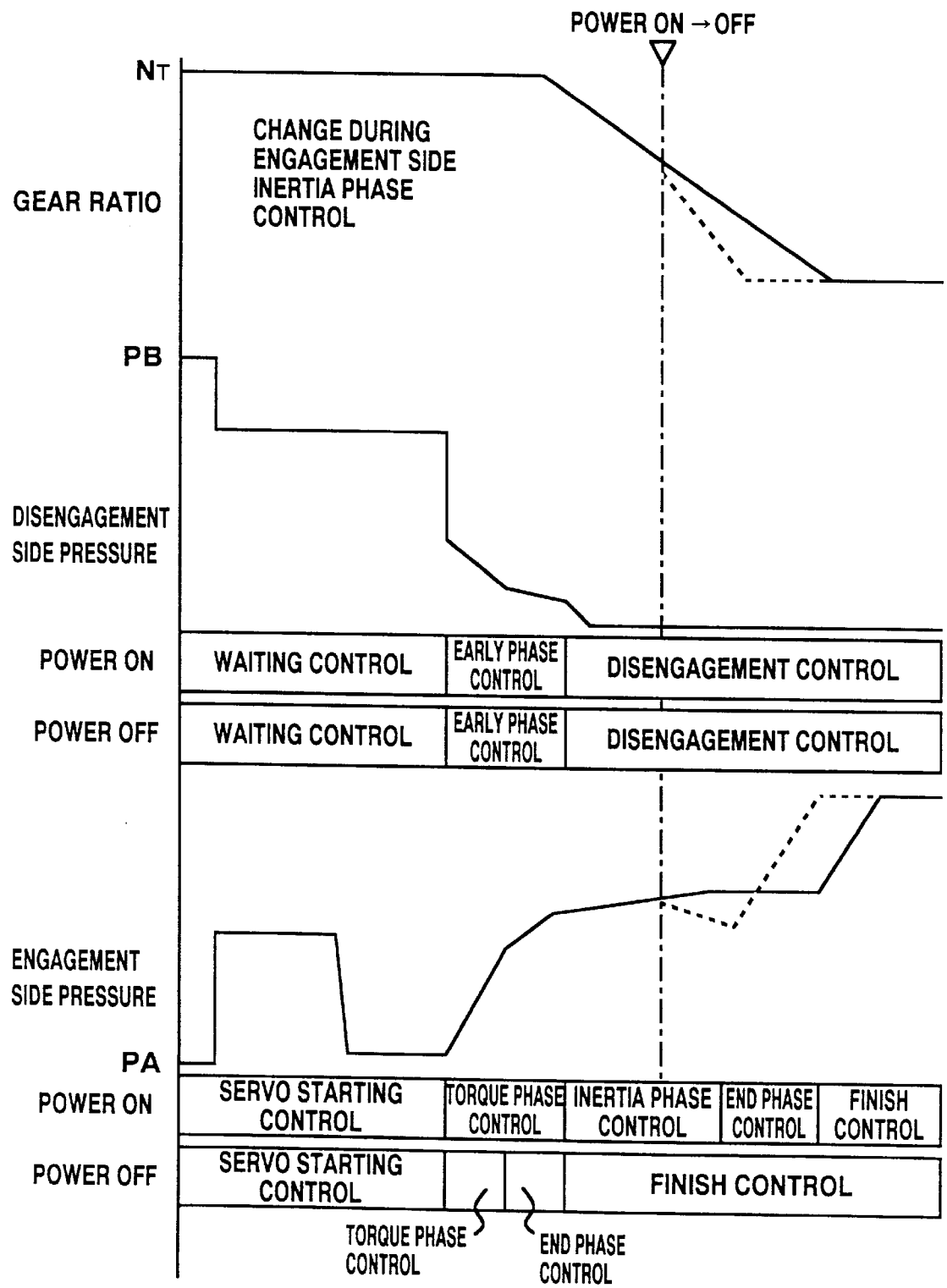
FIG. 13 is a time chart showing control signal pressures when the driving state is changed from power on state to power off state during engagement side inertia phase control.

FIG. 13 shows a change in the vehicle driving state from power on to power off during the engagement side inertia control. The input shaft rotational speed $N_T$ is reduced following the change to the power off state with the engagement side pressure PA under feedback control based on the input shaft rotational speed change. Therefore, the engagement side pressure PA is reduced and the shift control is feedback control.

The change from the power on state to the power off state during the up-shift is not limited to the foregoing. When the vehicle driving state is changed from power on to power off or is changed from power off to power on in another control state, control is executed with the common control logic based on the flow charts shown in FIG. 6 through FIG. 8 and FIG. 11, and the disengagement side (waiting) pressure $P_W$ shown in FIG. 9.

The teachings of pending Japanese application 9-240081, filed Sep. 4, 1997, inclusive of its specification, claims and drawings are incorporated by reference herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control system for an automatic transmission performing an up-shift to a predetermined gear ratio by engaging a first frictional engagement element and disengaging a second frictional engagement element comprising:

an input shaft which receives power from an engine output shaft;

an output shaft which is connected to vehicle wheels;

a plurality of frictional engagement elements for selectively changing torque transfer from the input shaft to the output shaft between plural torque transfer paths and comprising the first frictional engagement element and the second frictional engagement element;

hydraulic servos that engage and disengage the frictional engagement elements;

a hydraulic operator system which controls at least hydraulic pressures applied to the hydraulic servos for the first frictional engagement element and the second frictional engagement element; and a control unit which receives input signals from sensors which monitor various vehicle operating parameters and which outputs hydraulic control signals to said hydraulic operator system, said control unit comprising an input torque calculator which calculates an input torque, an engagement side pressure controller which signals said hydraulic operator system to control the hydraulic pressure applied to the hydraulic servo for the first frictional engagement element, and a disengagement side pressure controller which determines if the calculated input torque is above or below a predetermined value and signals said hydraulic operator system to control the hydraulic pressure applied to the hydraulic servo for the second frictional engagement element in accordance with the calculated input torque and said determination, said disengagement side hydraulic controller operating in a maintain mode, when the calculated input torque is determined to be above said predetermined valve, to set the hydraulic pressure for the second frictional engagement element to a pressure which is higher than a base pressure, and operating in a slip mode, when the calculated input torque is determined to be below said predetermined value, to set the hydraulic pressure for the second frictional engagement element to a pressure which is lower than the base pressure, said base pressure varying as a function of the calculated input torque and providing the second frictional engagement element with a torque capacity corresponding to the calculated input torque.

2. The hydraulic control system for an automatic transmission according to claim 1, wherein:

the hydraulic pressure for the second frictional engagement element is set in the maintain mode at least when the calculated input torque is a positive value, and is set in the slip mode when the calculated input torque is on the negative side of 0 input torque by more than a predetermined amount.

3. The hydraulic control system for an automatic transmission according to claim 2, wherein:

the base pressure has a minimum value when the input torque is said predetermined amount on the negative side of 0 input torque, and the base pressure is a positive pressure which increases from the minimum value as the input torque increases.

4. The hydraulic control system for an automatic transmission according to claim 3, wherein:

a difference between the base pressure and the set hydraulic pressure increases as the input torque increases in either a positive direction or a negative direction.

5. The hydraulic control system for an automatic transmission according to claim 4, wherein:

the base pressure is a value which is offset a predetermined amount from 0 input torque in the negative direction by an amount calculated based on the absolute value of the input torque.

6. The hydraulic control system for an automatic transmission according to claim 3, wherein:

the base pressure is set as a value which is offset a predetermined amount from 0 input torque in the negative direction and is calculated based on the absolute value of the input torque.

7. The hydraulic control system for an automatic transmission according to claim 2, wherein:

a difference between the base pressure and the set hydraulic pressure increases as the input torque increases in either a positive direction or a negative direction.

8. The hydraulic control system for an automatic transmission according to claim 7, wherein:

the base pressure is set as a value which is offset a predetermined amount from 0 input torque in the negative direction and is calculated based on the absolute value of the input torque.

9. The hydraulic control system for an automatic transmission according to claim 2, wherein:

the base pressure is set as a value which is offset a predetermined amount from 0 input torque in the negative direction and is calculated based on the absolute value of the input torque.

10. The hydraulic control system for an automatic transmission according to claim 1, wherein:

the base pressure has a minimum value when the input torque is said predetermined amount on the negative side of 0 input torque, and the base pressure is a positive pressure which increases from the minimum value as the input torque increases.

11. The hydraulic control system for an automatic transmission according to claim 10, wherein:

a difference between the base pressure and the set hydraulic pressure increases as the input torque increases in either a positive direction or a negative direction.

12. The hydraulic control system for an automatic transmission according to claim 11, wherein:

the base pressure is a value which is offset a predetermined amount from 0 input torque in the negative direction by an amount calculated based on the absolute value of the input torque.

13. The hydraulic control system for an automatic transmission according to claim 10, wherein:

a difference between the base pressure and the set hydraulic pressure increases as the input torque increases in either a positive direction or a negative direction.

14. The hydraulic control system for an automatic transmission according to claim 1, wherein:

a difference between the base pressure and the set hydraulic pressure increases as the input torque increases in either a positive direction or a negative direction.

15. The hydraulic control system for an automatic transmission according to claim 14, wherein:

a difference between the base pressure and the set hydraulic pressure increases as the input torque increases in either a positive direction or a negative direction.

16. The hydraulic control system for an automatic transmission according to claim 1, wherein:

the base pressure is a value which is offset a predetermined amount from 0 input torque in the negative direction by an amount calculated based on the absolute value of the input torque.

17. The hydraulic control system for an automatic transmission according to claim 1, wherein:

the disengagement side pressure controller comprises a corrector which corrects the hydraulic pressure set for the second frictional engagement element based on an amount of engine racing.

18. The hydraulic control system for an automatic transmission according to claim 17, wherein:

said corrector calculates the amount of engine racing based on a difference between a current rotational speed of said input shaft and a rotational speed of said input shaft based on a gear ratio before the up-shift, and performs a feedback control to correct the set hydraulic pressure based on the calculated amount of engine racing.

19. The hydraulic control system for an automatic transmission according to claim 18, wherein:

the pressure correction made by the corrector is a predetermined amount to the negative side of the set hydraulic pressure.

20. The hydraulic control system for an automatic transmission according to claim 19, wherein:

the pressure correction made by the corrector is a predetermined negative value when the calculated amount of engine racing is negative by more than a predetermined amount.

21. The hydraulic control system for an automatic transmission according to claim 18, wherein:

the pressure correction made by the corrector is a predetermined negative value when the calculated amount of engine racing is negative by more than a predetermined amount.

22. The hydraulic control system for an automatic transmission according to claim 17, wherein:

the pressure correction made by the corrector is a predetermined amount to the negative side of the set hydraulic pressure.

23. The hydraulic control system for an automatic transmission according to claim 22, wherein:

the pressure correction made by the corrector is a predetermined negative value when the calculated amount of engine racing is negative by more than a predetermined amount.

24. The hydraulic control system for an automatic transmission according to claim 17, wherein:

the pressure correction made by the corrector is a predetermined negative value when the calculated amount of engine racing is negative by more than a predetermined amount.

25. The hydraulic control system for an automatic transmission according to claim 1, wherein:

the engagement side pressure controller executes a servo starting control routine to apply a hydraulic pressure to the hydraulic servo for the first frictional engagement element which brings the first frictional engagement element to a state immediately preceding torque transmission by the first frictional engagement element.

26. The hydraulic control system for an automatic transmission according to claim 25, wherein:

the engagement side pressure controller executes a torque phase control routine which increases the hydraulic pressure for the first frictional engagement element with a predetermined gradient after the servo starting control.

27. The hydraulic control system for an automatic transmission according to claim 26, wherein:

the predetermined target pressure is a hydraulic pressure calculated based on the input torque when the input torque is a positive value, and the predetermined target pressure is a set value independent of the input torque when the input torque is a negative value.

28. The hydraulic control system for an automatic transmission according to claim 27, wherein:

the disengagement side pressure controller executes an early phase control routine in which the hydraulic pressure for the second frictional engagement element is controlled responsive to the hydraulic pressure in the torque phase control performed by the engagement side pressure controller.

29. The hydraulic control system for an automatic transmission according to claim 28, wherein:

the set hydraulic pressure in the early phase control is calculated based on a torque calculated by subtracting engagement side transmitted torque in the torque phase control from the absolute value of the input torque.

30. The hydraulic control system for an automatic transmission according to claim 26, wherein:

the disengagement side pressure controller executes an early phase control routine in which the hydraulic pressure for the second frictional engagement element is controlled responsive to the hydraulic pressure in the torque phase control performed by the engagement side pressure controller.

31. The hydraulic control system for an automatic transmission according to claim 30, wherein:

the set hydraulic pressure in the early phase control is calculated based on a torque calculated by subtracting engagement side transmitted torque in the torque phase control from the absolute value of the input torque.

32. The hydraulic control system for an automatic transmission according to claim 1 wherein said predetermined value for calculated input torque is a calculated input torque corresponding to a base pressure of 0.

33. The hydraulic control system for an automatic transmission according to claim 1 wherein said disengagement side hydraulic controller calculates base pressures based on an absolute value of the calculated input torque.

34. The hydraulic control system for an automatic transmission according to claim 1 further comprising:

a single map, stored in a memory, wherein said higher and lower hydraulic pressures for the second frictional engagement element are correlated with positive and negative values for calculated input torque.

35. A recording medium for use in a hydraulic control system for an automatic transmission comprising an input shaft which receives power from an engine output shaft, an output shaft which is connected to vehicle wheels, a plurality of frictional engagement elements for selectively changing torque transfer from the input shaft to the output shaft between plural torque transfer paths, hydraulic servos that engage and disengage the frictional engagement elements, said hydraulic control system performing an up-shift to a predetermined gear ratio by engaging a first frictional engagement element in the plurality of frictional engagement elements and disengaging a second frictional engagement element in the plurality of frictional engagement elements, said recording medium being readable by a computer which receives input signals from a hydraulic operating means which controls at least hydraulic pressures applied to hydraulic servos for the first frictional engagement element and the second frictional engagement element and from sensors which monitor various vehicle operating parameters and which outputs a hydraulic control signal, said recording medium comprising, encoded thereon:

an input torque calculator routine which calculates an input torque fed as a signal to an engagement side hydraulic controller which controls the hydraulic pressure applied to the hydraulic servo for the first frictional engagement element, and/or to a disengagement side hydraulic controller which controls the hydraulic pressure applied to the hydraulic servo for the second frictional engagement element, and a pressure control routine comprising:

determining if the calculated input torque is above or below a predetermined value;

determining a base pressure as a function of the calculated input torque, which provides the second frictional engagement element with a torque capacity corresponding to the calculated input torque;

when the calculated input torque is determined to be above the predetermined value, setting the hydraulic pressure for the second frictional engagement element to a pressure which is higher than the base pressure; and when the calculated input torque is determined to be below the predetermined value, setting the hydraulic pressure for the second frictional engagement element to a pressure which is below the base pressure.

36. A recording medium according to claim 35 wherein said predetermined value for calculated input torque is a calculated input torque corresponding to a base pressure of 0.

37. A recording medium according to claim 35 wherein the base pressure is calculated based on an absolute value of the calculated input torque.

* * * * *